(12) United States Patent
Obrecht et al.

(10) Patent No.: US 6,620,866 B1
(45) Date of Patent: Sep. 16, 2003

(54) RUBBER MIXTURES AND VULCANIZATES CONTAINING AGGLOMERATED RUBBER GELS

(75) Inventors: Werner Obrecht, Moers (DE); Winfried Jeske, Burscheid (DE)

(73) Assignee: Bayer Aktiengesellschaft, Leverkusen (DE)

( * ) Notice: Subject to any disclaimer, the term of this patent is extended or adjusted under 35 U.S.C. 154(b) by 179 days.

(21) Appl. No.: 09/639,688

(22) Filed: Aug. 16, 2000

(30) Foreign Application Priority Data

Aug. 23, 1999 (DE) .......................... 199 39 865

(51) Int. Cl.⁷ ................................ C08K 5/00
(52) U.S. Cl. .................. 524/81; 526/335; 526/348.2; 526/348.5; 526/348.6
(58) Field of Search ................ 524/81; 526/335, 526/348.2, 348.5, 348.6

(56) References Cited

U.S. PATENT DOCUMENTS

| | | | |
|---|---|---|---|
| 2,187,146 A | 1/1940 | Calcotte et al. ............. 18/57 |
| 3,873,489 A | 3/1975 | Thurn et al. ......... 260/33.6 AQ |
| 4,709,065 A | 11/1987 | Yoshioka et al. ........... 556/428 |
| 5,124,408 A | 6/1992 | Engels et al. .............. 525/215 |
| 5,227,425 A | 7/1993 | Rauline ...................... 524/493 |
| 5,395,891 A | 3/1995 | Obrecht et al. ............. 525/194 |
| 5,717,038 A | 2/1998 | Hörpel et al. ............. 525/332.4 |
| 6,127,488 A | 10/2000 | Obrecht et al. ............. 525/333.3 |
| 6,399,706 B1 * | 6/2002 | Obrecht et al. ............. 525/191 |

FOREIGN PATENT DOCUMENTS

| | | |
|---|---|---|
| CA | 2226804 | 7/1998 |
| CA | 2279167 | 2/2000 |
| GB | 1078400 | 8/1967 |

OTHER PUBLICATIONS

Hawley's Condensed Chemical Dictionary by Richard J. Lewis, Sr. Thirteen Edition, John Wiley and Sons Inc., 1977 (p. 26, 656).*

Colloid & Polymer Sci., 258, (month unavailable), 1980, pp. 1077–1085, H. Lange, "Schnelle Dichtegradienten–Zentrifugation Dispergierter Teilchen".

Colloid & Polymer Sci, 267, (month unavailable), 1989, pp. 1113–1116, H. G. Müller, "Automated Determination of Particle–Size Distributions of Dispersions by Analytical Ultracentrifugation".

Houben–Weyl, Methoden der Organischen Chemie, 4th edition, vol. 14/2, (date unavailable), pp. 840–849, "Speziello Umsetzungen von Naturkautschuk".

Ullmann's Encyclopedia of Industrial Chemistry, VCH Verlagsgesellschaft mbH, D–69451 Weinheim, vol. A23, (month unavailable), 1993, pp. 263, W. Obrecht, "Rubber, 3 Synthetic".

* cited by examiner

Primary Examiner—David W. Wu
Assistant Examiner—William Cheung
(74) Attorney, Agent, or Firm—Joseph C. Gil; Jennifer R. Seng; Noland J. Cheung

(57) ABSTRACT

The vulcanizates produced using the rubber mixtures according to the invention, in which the vulcanizates contain agglomerated rubber gels, are distinguished by improved mechanical properties with an at least equivalent damping behavior.

7 Claims, No Drawings

RUBBER MIXTURES AND VULCANIZATES CONTAINING AGGLOMERATED RUBBER GELS

FIELD OF THE INVENTION

The invention relates to agglomerated rubber gels, to rubber mixtures produced therefrom and to the use thereof. The vulcanizates containing agglomerated rubber gels are distinguished, in comparison with compounds that contain the corresponding non-agglomerated gels, by improved mechanical properties with at least an equivalent damping behavior. In particular, rubber mixtures containing "structured" rubber gels, as well as compounds based on silica-containing agglomerated rubber gels which have been activated by sulfur-containing silicon compounds, exhibit especially advantageous mechanical properties.

BACKGROUND OF THE INVENTION

The use of microgels in rubber compounds is described in the following patent applications and patents: EP-A 405, 216, DE-A 4,220,563, GB-B 1,078,400 and EP-A 854,171 EP 432,405 and EP 432,417. Patents/patent applications EP-A 405,216, DE-A 4,220,563 and GB-B 1,078,400 describe the use of CR, BR and NR microgels for mixtures with double-bond-containing rubbers and for the production of the corresponding vulcanizates. The vulcanizates are suitable especially for the production of tire treads, since they exhibit a high rebound resilience at 70° C. and hence low rolling resistance, and a low rebound resilience at 23° C. and hence a high wet-skid resistance. In particular, the large difference between the rebound resilience at 70° C. and that at 23° C. is characteristic of vulcanizates containing microgels. For industrial use in tire treads, however, the mechanical properties of microgel-containing vulcanizates are inadequate. Deficiencies exist especially in the level of mechanical vulcanizate properties. There is a need to improve the product from the tensile stress at 300% elongation and elongation at tear as well as the abrasion resistance.

Sulfur-containing organosilicon compounds play a particular part in the activation of silica-containing rubber mixtures. The following patent specifications are mentioned by way of examples: U.S. Pat. No. 3,873,489 (Degussa), U.S. Pat. No. 4,709,065 (Shin-Etsu) and U.S. Pat. No. 5,227,425 (Michelin), EP-B 670,347, EP-A 753,549, EP-A 864,608.

These patents do not teach the improvement of the mechanical properties of vulcanizates based on rubber gels by the use of agglomerated rubber gels or rubber gels co-agglomerated with inorganic fillers, such as silica.

SUMMARY OF THE INVENTION

The technical object was, therefore, to improve the level of mechanical values (tensile stress (300%×elongation at tear)) as well as the abrasion resistance of microgel-containing rubber vulcanizates, without impairing the difference between the rebound resilience at 70° C. and at 23° C.

It has now been found that it is possible to improve the reinforcing effect of rubber gels in vulcanizates if the rubber gels are used in agglomerated form. The reinforcing effect of the agglomerated rubber gels is especially pronounced if the particles are unable to assume the thermodynamically most advantageous spherical form after the agglomeration, that is to say if the agglomerated particles have a certain structure. In particular, the use of rubber gels co-agglomerated with inorganic fillers, such as silica, is especially advantageous. The reinforcing effect of the silica-containing rubber gels is improved further because a sulfur-containing organosilicon compound is additionally used in the compounding.

Accordingly, the present invention provides rubber mixtures containing at least one agglomerated rubber gel (A), at least one double-bond-containing rubber (B), and at least one sulfur-containing organosilicon compound (C), the amount of double-bond-containing rubber (B) being 100 parts by weight, the amount of rubber gel (A) being from 1 to 150 parts by weight, preferably from 10 to 100 parts by weight, and the amount of organosilicon sulfur compound (C) being from 0.2 to 20 parts by weight, preferably from 1 to 10 parts by weight, as well as further rubber auxiliary substances and, optionally, further fillers.

DETAILED DESCRIPTION OF THE INVENTION

As discussed above, the present invention relates to rubber mixtures containing at least one agglomerated rubber gel (A), at least one double-bond-containing rubber (B), and at least one sulfur-containing organosilicon compound (C), the amount of double-bond-containing rubber (B) being 100 parts by weight, the amount of rubber gel (A) being from 1 to 150 parts by weight, preferably from 10 to 100 parts by weight, and the amount of organosilicon sulfur compound (C) being from 0.2 to 20 parts by weight, preferably from 1 to 10 parts by weight, as well as further rubber auxiliary substances and, optionally, further fillers.

Agglomerated rubber gels (A) are to be understood as being rubber gels having particle diameters of from 5 to 5000 nm. They have a broad particle size distribution, characterized by the difference between the $d_{80}$ and $d_{10}$ values, which is greater than 25 nm. The characteristic diameters $d_{10}$ and $d_{80}$ are the diameters below which 10 wt. % and 80 wt. %, respectively, of the particles lie. The particle size distributions are determined by means of ultracentrifugation according to H. Lange, "Schnelle Dichtegradienten-zentrifugation dispergierter Teilchen", Colloid & Polymer Sci. 258, 1077–1085 (1980) or H. G. Müller, "Automated determination of particle-size distributions of dispersions by analytical ultracentrifugation", Colloid & Polymer Science 267: 113–116 (1989).

In cases where the agglomerated particles are not in spherical form after the agglomeration and have "structure", these can be identified by suitable methods, for example by electron microscopy.

Due to their crosslinking, the rubber gels are insoluble and are swellable in suitable swelling agents, such as toluene. The swelling indices of the microgels ($Q_i$) in toluene are from 1 to 15, preferably from 1 to 10. The swelling index is calculated from the weight of the gel containing solvent (after centrifugation at 20,000 rpm) and the weight of the dry gel:

$Q_i$=wet weight of the gel/dry weight of the gel.

In order to determine the swelling index, 250 mg of gel, for example, are allowed to swell in 25 ml of toluene for 24 hours, with shaking. The gel is removed by centrifugation and weighed and is then dried at 70° C. until a constant weight is reached and then weighed again.

The agglomerated rubber gels may also contain inorganic fillers, especially silica, in amounts of approximately from 3 to 80 wt. %, preferably from 5 to 50 wt. %, rubber gels containing fillers having lower swelling indices due to their filler content. If, in those cases, the swelling indices are related to the pure rubber component of the gel containing filler, then they are within the range indicated above.

For the production of the rubber gels, the following rubbers are used:

| | |
|---|---|
| BR: | polybutadiene, |
| ABR: | butadiene/acrylic acid $C_1$-$C_4$-alkyl ester copolymers, |
| IR: | polyisoprene, |
| SBR: | styrene-butadiene copolymers having styrene contents of from 1 to 60 wt. %, preferably from 2 to 50 wt. %, |
| X-SBR: | carboxylated styrene-butadiene copolymers, |
| FKM: | fluorine rubber, |
| ACM: | acrylate rubber, |
| NBR: | polybutadiene-acrylonitrile copolymers having acrylonitrile contents of from 5 to 60 wt. %, preferably from 10 to 50 wt. %, |
| X-NBR: | carboxylated nitrile rubbers, |
| CR: | polychloroprene, |
| IIR: | isobutylene/isoprene copolymers having isoprene contents of from 0.5 to 10 wt. %, |
| BIIR: | brominated isobutylene/isoprene copolymers having bromine contents of from 0.1 to 10 wt. %, |
| CIIR: | chlorinated isobutylene/isoprene copolymers having chlorine contents of from 0.1 to 10 wt. %, |
| HNBR: | partially and completely hydrogenated nitrile rubbers, |
| EPDM: | ethylene-propylene-diene copolymers, |
| EAM: | ethylene/acrylate copolymers, |
| EVM: | ethylene/vinyl acetate copolymers, |
| ECO: | epichlorohydrin rubber, |
| Q: | silicone rubbers, |
| AU: | polyester urethane polymers, |
| EU: | polyether urethane polymers, |
| ENR: | epoxidized natural rubber or mixtures thereof. |

Preparation of the uncrosslinked rubber starting materials is carried out by the following methods:

1. emulsion polymerization,
2. solution polymerization of rubbers which are not obtainable by method 1,
3. in addition, naturally occurring latexes, such as, for example, natural rubber latex, can be used.

In the preparation of microgels by emulsion polymerization, the following radically polymerizable monomers are used: butadiene, styrene, acrylonitrile, isoprene, esters of acrylic and methacrylic acid, tetrafluoroethylene, vinylidene fluoride, hexafluoropropene, 2-chlorobutadiene, 2,3-dichlorobutadiene, as well as double-bond-containing carboxylic acids, such as, for example, acrylic acid, methacrylic acid, maleic acid, itaconic acid, etc., double-bond-containing hydroxy compounds, such as, for example, hydroxyethyl methacrylate, hydroxyethyl acrylate, hydroxybutyl methacrylate, etc., or double-bond-containing epoxides, such as, for example, glycidyl methacrylate or glycidyl acrylate. Crosslinking of the rubber gel can be achieved directly during the emulsion polymerization by copolymerization with multifunctional compounds having a crosslinking action. Preferred multifunctional comonomers are compounds having at least two, preferably from 2 to 4, co-polymerizable C=C double bonds, such as diisopropenylbenzene, divinylbenzene, divinyl ether, divinylsulfone, diallyl phthalate, triallyl cyanurate, triallyl isocyanurate, 1,2-polybutadiene, N,N'-m-phenylene maleimide, 2,4-toluylene bis-(maleimide) and/or triallyl trimellitate. The acrylates and methacrylates of polyhydric, preferably di- to tetra-hydric, $C_2$ to $C_{10}$ alcohols, such as ethylene glycol, propanediol-1,2-butanediol, hexanediol, polyethylene glycol having from 2 to 20, preferably from 2 to 8, oxyethylene units, neopentyl glycol, bisphenol A, glycerol, trimethylol-propane, pentaerythritol, sorbitol with unsaturated polyesters of aliphatic diols and polyols, as well as maleic acid, fumaric acid and/or itaconic acid may also be considered.

Crosslinking to rubber gels during the emulsion polymerization can also be carried out by continuing the polymerization up to high conversions or in the monomer supply process by polymerization with high internal conversions. Another possibility consists in carrying out the emulsion polymerization in the absence of regulators.

For the preparation of highly and/or slightly crosslinked polymers following the emulsion polymerization, it is best to use the latexes that are obtained in the emulsion polymerization. Natural rubber latexes can also be crosslinked in this manner. The method can also be applied to aqueous polymer dispersions, which are obtainable by recrystallizing the rubbers from organic solutions. In principle, that method can also be used in the case of non-aqueous polymer dispersions.

Chemicals having a suitable crosslinking action are, for example, organic peroxides, such as dicumyl peroxide, tert.-butylcumyl peroxide, bis-(tert.-butyl-peroxy-isopropyl) benzene, di-tert.-butyl peroxide, 2,5-dimethylhexane 2,5-dihydroperoxide, 2,5-dimethylhexyne 3,2,5-dihydroperoxide, dibenzoyl peroxide, bis-(2,4-dichlorobenzoyl) peroxide, tert.-butyl perbenzoate, as well as organic azo compounds, such as azo-bis-isobutyronitrile and azo-bis-cyclohexanenitrile, as well as di- and poly-mercapto compounds, such as dimercaptoethane, 1,6-dimercaptohexane, 1,3,5-trimercaptotriazine and mercapto-terminated polysulfide rubbers, such as mercapto-terminated reaction products of bis-chloroethylformal with sodium polysulfide. The optimum temperature for carrying out the after-crosslinking is naturally dependent on the reactivity of the crosslinking agent and can be carried out at temperatures from room temperature to approximately 180° C., optionally under elevated pressure (see in this connection Houben-Weyl, Methoden der organischen Chemie, 4th edition, Volume 14/2, page 848). Especially preferred crosslinking agents are peroxides.

The crosslinking of rubbers containing C=C double bonds to microgels can also be carried out in dispersion or emulsion with the simultaneous partial, optionally complete, hydrogenation of the C=C double bond by hydrazine, as described in U.S. Pat. No. 5,302,696 or U.S. Pat. No. 5,442,009, or optionally other hydrogenating agents, for example organometal hydride complexes.

Rubbers produced by solution polymerization may also be used as starting materials for the production of the microgels. In those cases, the solutions of those rubbers in suitable organic solutions are used as starting materials. The desired sizes of the microgels are produced by mixing the rubber solution in a liquid medium, preferably in water, optionally with the addition of suitable surface-active auxiliary substances, such as, for example, surfactants, by means of suitable apparatus, so that a dispersion of the rubber in the appropriate particle size range is obtained. For crosslinking the dispersed solution rubbers, the procedure is as described above for the subsequent crosslinking of emulsion polymers. The compounds mentioned above are suitable as crosslinking agents, it being possible for the solvent used for the preparation of the dispersion optionally to be removed, for example by distillation, before the crosslinking.

Agglomeration of the rubber latexes or of the rubber gels can be carried out in various ways. Chemical and physical methods of agglomeration are suitable in principle (W. Obrecht in Ullmann's Encyclopedia of Industrial Chemistry, VCH Verlagsgesellschaft mbH, D-69451 Weinheim, 1993, Vol. A23, Rubber, 3. Synthetic, p. 263).

If the agglomeration of uncrosslinked or slightly crosslinked rubber latexes is carried out, they assume the thermodynamically most advantageous spherical form after the agglomeration. If rubber gels that have been crosslinked to a greater extent (pre-crosslinking) are used in the agglomeration, in which the gels are unable to assume a spherical form in the agglomerated state due to their pre-crosslinking, agglomerated rubber gels with structure are obtained. For the production of agglomerated gels with structure, it has been proven to be advantageous to use pre-crosslinked gels as the starting material, to carry out an agglomeration and to carry out a further crosslinking (after-crosslinking) after the agglomeration. The methods described above are suitable for the pre- and after-crosslinking of the rubber gels.

For the preparation of rubber gels containing uncrosslinked or pre-crosslinked rubber latexes, which are mixed with an aqueous dispersion of the inorganic filler, and the rubber is agglomerated in the presence of the inorganic filler. After the co-agglomeration, further crosslinking of the rubber component (after-crosslinking) is advantageously carried out. The inorganic filler and the rubber gel are fixed physically/chemically by means of the co-agglomeration/after-crosslinking, so that in the subsequent isolation of the co-agglomerate from the aqueous phase, virtually no losses occur especially in the case of finely divided inorganic components having specific surface areas greater than 100 $m^2/g$. This can be verified with the aid of the ash contents of the rubber gels.

The following inorganic fillers, for example, are suitable for the preparation of rubber gels containing fillers: carbon black, silica, calcium carbonate, magnesium carbonate, dolomite, barium sulfate, aluminum silicates, aluminum oxide and/or zinc oxide, preferably silica.

The dispersions of the inorganic fillers in water are prepared either by fine distribution (grinding) in the presence of suitable surfactants, or by precipitation in the presence of suitable auxiliary substances, such as anionic or cationic surfactants.

The following aqueous dispersions of inorganic fillers, for example, are available commercially: aqueous pigment carbon black dispersions from Degussa "Derussol®" (inorganic industrial products division, D-60287 Frankfurt) and aqueous silica dispersions "Levasil®" from Bayer AG, D-5090 Leverkusen.

The co-agglomerated rubber gels contain inorganic fillers in amounts of from 3 to 80 wt. %.

Double-bond-containing rubber (B) is to be understood as meaning rubbers, which are designated R rubbers according to DIN/ISO 1629. Such rubbers have a double bond in the main chain. They include, for example:

| | |
|---|---|
| NR | natural rubber |
| SBR: | styrene/butadiene rubber |
| BR | polybutadiene rubber |
| NBR: | nitrile rubber |
| IIR: | butyl rubber |
| HNBR: | hydrogenated nitrile rubber |
| SNBR: | styrene/butadiene/acrylonitrile rubber |
| CR: | polychloroprene |
| XSBR: | carboxylated styrene/butadiene rubber |
| XNBR: | carboxylated butadiene/acrylonitrile rubber |
| ENR: | epoxidized natural rubber |
| ESBR: | epoxidized styrene/butadiene rubber |

Double-bond-containing rubbers are, however, also to be understood as being rubbers that are M rubbers according to DIN/ISO 1629 and contain double bonds in side chains in addition to the saturated main chain. They include, for example, EPDM.

The sulfur-containing organosilicon compounds (C) have the following basic structures:

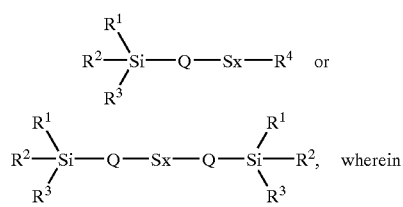

$R^1$, $R^2$ and $R^3$ represent alkoxy groups having from 1 to 20 carbon atoms, X represents integers from 2 to 8, Q is a spacer group having structural elements based on aliphatic, heteroaliphatic, aromatic and heteroaromatic hydrocarbon chains, having from 1 to 20 carbon atoms and from 1 to 3 hetero atoms, such as N, S, O, and $R^4$ represents a group that is found especially in so-called vulcanization accelerators, for example:

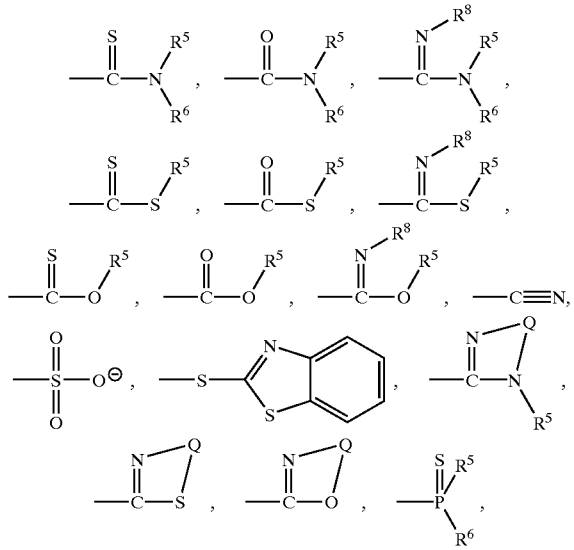

wherein $R^5$, $R^6$ and $R^8$ represent $C_1$–$C_{10}$-alkyl, $C_6$–$C_{10}$-aryl and $C_7$–$C_{12}$-aralky and Q is as defined above.

The preferred sulfur-containing organosilicon compound is bis(tri-ethoxy-silyl-propyl-disulfane), which is shown in the formula below. Such a product is available commercially as Si 69 from Degussa:

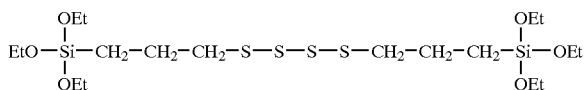

The rubber mixtures according to the present invention of agglomerated rubber gel (A), double-bond-containing rubber (B) and sulfur-containing organosilicon compound (C) may contain additional further components such as fillers.

Especially suitable fillers for the preparation of the rubber mixtures and vulcanizates according to the invention are:

1) carbon blacks. The carbon blacks to be used in this invention are prepared by the flame carbon black, furnace or gas carbon black process and have BET surface areas of from 20 to 200 m²/g, such as, for example: SAF, ISAF, IISAF, HAF, FEF or GPF carbon blacks.

2) highly dispersed silica, prepared, for example, by the precipitation of solutions of silicates or the flame hydrolysis of silicon halides having specific surface areas of from 5 to 1000 m²/g, preferably from 20 to 400 m²/g (BET surface area) and primary particle sizes of from 5 to 400 nm. The silicas may optionally also be present in the form of mixed oxides with other metal oxides, such as Al, Mg, Ca, Ba, Zn and Ti oxides.

3) synthetic silicates, such as aluminum silicate, alkaline earth metal silicate, such as magnesium silicate or calcium silicate, having BET surface areas of from 20 to 400 m²/g and primary particle diameters of from 5 to 400 nm.

4) natural silicates, such as kaolin and other naturally occurring silicas.

5) metal oxides, such as zinc oxide, calcium oxide, magnesium oxide, aluminum oxide.

6) metal carbonates, such as calcium carbonate, magnesium carbonate, zinc carbonate.

7) metal sulfates, such as calcium sulfate, barium sulfate.

8) metal hydroxides, such as aluminum hydroxide and magnesium hydroxide.

9) glass fibers and glass fiber products (laths, threads or glass microspheres).

10) thermoplastic fibers (polyamide, polyester, aramid).

The above-mentioned fillers may be used alone or in the form of mixtures. In an especially preferred form of the process, from 10 to 100 parts by weight of rubber gel (A), optionally together with from 0.1 to 100 parts by weight of carbon black and/or from 0.1 to 100 parts by weight of light fillers, in each case based on 100 parts by weight of uncrosslinked rubber, are used.

The rubber mixtures according to the present invention may contain further rubber auxiliary substances, such as, for example, crosslinking agents, reaction accelerators, anti-aging agents, heat stabilizers, light stabilizers, anti-oxidants, processing auxiliaries, plasticizers, tackifiers, blowing agents, colorings, pigments, wax, extenders, organic acids, retarding agents, metal oxides, as well as filler activators, such as, for example, triethanolamine, polyethylene glycol, hexanetriol, bis-(triethoxysilylpropyl)tetrasulfide or others which are known in the rubber industry.

The rubber auxiliary substances are used in conventional amounts, which are dependent, inter alia, on the intended use. Conventional amounts are, for example, amounts of from 0.1 to 50 wt. %, based on the amounts of rubber (B) used.

They may be used as conventional crosslinking agents sulfur, sulfur donors, peroxides or crosslinking agents such as, for example, diisopropenylbenzene, divinylbenzene, divinyl ether, divinylsulfone, diallyl phthalate, triallyl cyanurate, triallyl isocyanurate, 1,2-polybutadiene, N,N'-m-phenylene maleimide and/or triallyl trimellitate. The acrylates and methacrylates of polyhydric, preferably di- to tetra-hydric, $C_2$ to $C_{10}$ alcohols, such as ethylene glycol, propanediol-1,2-butanediol, hexanediol, polyethylene glycol having from 2 to 20, preferably from 2 to 8, oxyethylene units, neopentyl glycol, bisphenol A, glycerol, trimethylolpropane, pentaerythritol, sorbitol with unsaturated polyesters of aliphatic diols and polyols as well as maleic acid, fumaric acid and/or itaconic acid may also be considered.

The rubber mixtures according to the present invention may also contain vulcanization accelerators. Examples of suitable vulcanization accelerators are mercaptobenzothiazoles, -sulfenamides, guanidines, thiurams, dithiocarbamates, thioureas and thiocarbonates, as well as dithiophosphates. The vulcanization accelerators, sulfur and sulfur donors or peroxides or other crosslinking agents, such as, for example, dimeric 2,4-toluylidene diisocyanate (=Desmodur TT) or 1,4-bis-1-ethoxyhydroquinone (=crosslinking agent 30/10), are used in amounts of from 0.1 to 40 wt. %, preferably from 0.1 to 10 wt. %, based on the total amount of rubber (B). Vulcanization of the rubber mixtures according to the present invention may be carried out at temperatures of from 100 to 250° C., preferably from 130 to 180° C., optionally under a pressure of from 10 to 200 bar.

The mixtures according to the invention of agglomerated rubber gel (A), double-bond-containing rubber (B) and sulfur-containing organosilicon compound (C) can be prepared in various ways.

On the one hand, it is, of course, possible to mix the individual solid components. Apparatus suitable therefor are, for example, rollers, kneaders or mixing extruders. Mixing by combining the latexes of the uncrosslinked or of the crosslinked rubbers is, however, also possible. The mixture according to the invention so prepared can be isolated in the conventional manner, by concentration by evaporation, precipitation or freeze-coagulation (see U.S. Pat. No. 2,187,146). By mixing fillers into the latex mixture and subsequently working up, the mixtures according to the present invention can be obtained directly as a rubber/filler formulation. The addition of further components to the rubber mixture of agglomerated rubber gel (A), uncrosslinked rubber (B) and sulfur-containing organosilicon compound (C), such as additional fillers and, optionally, rubber auxiliary substances, is carried out in conventional mixing apparatus, rollers, kneaders or mixing extruders. Preferred mixing temperatures are from 50 to 180° C.

The rubber vulcanizates according to the present invention are suitable for the production of molded bodies, for example, for the production of cable coverings, hoses, drive belts, conveyor belts, roller coatings, tires, especially tire treads, shoe soles, gaskets and damping elements, as well as membranes.

EXAMPLES

Example 1

Production of the NR Masterbatches Containing Rubber Gel

The NR masterbatches of the rubber gels are produced starting from the use of Baystal 1357 from Polymer Latex GmbH (formerly: Bayer France, Port Jérôme) in the following reaction steps:

i) pre-crosslinking with dicumyl peroxide;
ii) homo-agglomeration or co-agglomeration with silica sols;
iii) after-crosslinking or crosslinking with dicumyl peroxide;
iv) working up as the natural rubber masterbatch.

For the pre-crosslinking with dicumyl peroxide (DCP), a Baystal 1357 latex batch having a styrene content of 25 wt. % is diluted to a solids concentration of 30 wt. % and introduced into an autoclave. DCP is added in solid form at room temperature (0.1 phr, based on solid product). The DCP is melted by heating the latex to 60° C. and is distributed thoroughly in the latex, with stirring. For the removal of oxygen, the contents of the reactor are evacuated at 60° C., with stirring, and nitrogen is introduced under pressure. The cycle of evacuation/gassing with $N_2$ is repeated three times. The reactor is then heated to 150° C. In order to avoid latex becoming caked on during the heating, it is ensured that the difference between the casing temperature and the internal temperature does not exceed 10° C. After heating, the internal temperature is maintained at least 150° C. for 45 minutes. The latex is then cooled and filtered over a Monodur cloth. The particle size of the latex is virtually unaffected by the pre-crosslinking with DCP ($d_{10}$=53 nm, $d_{50}$=58 nm and $d_{80}$=63 nm). The diameter values $d_{10}$, $d_{50}$ and $d_{80}$, are obtained from the integral mass distribution curve, in which 10, 50 and 80 are percentages, by weight referring to the corresponding weight fraction of the particles. The gel content rises from 75 to 94 wt. % and the density from 0.928 to 0.935 g/cm$^3$; the swelling index falls from 61 to 17 and the glass temperature rises slightly from −57 to −56° C.

Homo-agglomeration of the latexes is carried out in a Gaulin high-pressure homogenizer, type: LAB 100 (A.P.V. Schröder GmbH, Lübeck, Mecklenburger Strasse 223). For the agglomeration, the latexes are diluted to the solids contents indicated in the tables. The agglomeration is carried out at room temperature. The agglomeration pressure and the number of passes through the homogenizer are varied, the latexes being agglomerated both in the condition in which they are supplied, that is to say without pre-crosslinking with DCP, and after pre-crosslinking with 0.1 phr DCP.

Co-agglomeration of the pre-crosslinked latexes with silica sols is carried out as follows: in a first step, the aqueous latexes are mixed with the aqueous silica sols in the ratios indicated below, and in the second step, they are agglomerated together in the high-pressure homogenizer.

The silica sols Levasil 200 and Levasil test product AC 4055 are used. Those products from Bayer AG Leverkusen exhibit the following characteristic data:

TABLE 1

|  | Solids Content [wt. %] | pH value (20° C.) | Density (20° C.) [g/cm$^3$] | Viscosity (20° C.) [mPa.s] | Na$_2$O content [wt. %] | Specific surface area [m$^2$/g] |
|---|---|---|---|---|---|---|
| Levasil 200 | 30.1 | 9.0 | 1.205 | 4.61 | 0.148 | 203 |
| Levasil test product AC 4055 | 15.5 | 9.2 | 1.099 | 2.53 | 0.107 | 432 |

After-crosslinking with dicumyl peroxide (DCP) is carried out as described in the case of the pre-crosslinking with DCP using the amounts indicated in the following tables.

The rubber gels present in the form of latex are worked up as a masterbatch with natural rubber. To that end, the aqueous dispersions of the rubber gels are mixed with natural rubber latex in a ratio of 50/50 (based on solid) and isolated from the aqueous phase in the form of a solid product.

To that end, in each case, 5 kg of the SBR rubber latex so treated having a solids content of 30 wt. % are stirred into a mixture of 5 kg of natural rubber latex having a solids content of 30 wt. %, 300 g of a 5% aqueous resinate solution (Dresinate 731, manufacturer: Hercules) and 150 g of a 10% aqueous dispersion of the anti-ageing agent Vulkanox 4020 (manufacturer: Bayer AG). The resulting latex mixture contains crosslinked rubber and natural rubber in a weight ratio of 1:1.

For the precipitation of 3 kg of rubber mixture, 10.45 kg of the latex mixture are stirred at 65° C. into a solution of 225 g of NaCl, 40.8 g of Al$_2$(SO$_4$)$_3$×18 H$_2$O, 4.5 g of gelatin in 30 liters of water, the pH value being maintained at 4 by the addition of 10% H$_2$SO$_4$. The product is washed thoroughly with water and dried for 2 days at 70° C. in vacuo.

A masterbatch consisting of 50 wt. % SBR rubber gel, which optionally also contains silica, with 50 wt. % natural rubber is obtained.

The preparation of the rubber gels used in the various mixture series is described hereinbelow. In addition, the analytical data of those gels are collected in the tables.

Gels for Use in Mixture Series 1)

TABLE 2

| Gel no. | Gel (1) | Gel (2) | Gel (3) | Gel (4) |
|---|---|---|---|---|
| Styrene content [wt. %] | 22.5 | 22.5 | 22.5 | 22.5 |
| Pre-crosslinking with DCP [phr] | — | — | — | — |
| Solids content [wt. %] | 30 | 20 | 27.5 | 30 |
| Agglomeration pressure [bar] | — | 200 | 0 | 200 |
| Number of passes [n] | — | 1 | 0 | 1 |
| After-crosslinking with DCP [phr] | 1.0 | 1.0 | 1.5 | 1.5 |
| $d_{10}$ [nm] | 53 | 62 | 54 | 64 |
| $d_{50}$ [nm] | 59 | 405 | 59 | 395 |
| $d_{80}$ [nm] | 63 | 798 | 63 | 743 |
| Density of the latex particles [g/cm$^3$] | 0.962 | 0.958 | 0.971 | 0.973 |
| Gel content [wt. %] | 96 | 98 | 97 | 98 |
| Swelling index | 7.7 | 6.0 | 6.4 | 4.4 |
| Glass temperature [° C.] | −38 | −39.5 | −30.5 | −27.5 |

Gels for Use in Mixture Series 2)

TABLE 3

| Gel no. | Gel (5) | Gel (6) | Gel (7) | Gel (8) |
|---|---|---|---|---|
| Styrene content [wt. %] | 24.8 | 24.8 | 24.8 | 24.8 |
| Pre-crosslinking with DCP [phr] | — | 0.1 | 0.1 | 0.1 |
| Solids content [wt. %] | — | 29.7 | 29.7 | 29.7 |
| pH value | — | 9.7 | 9.7 | 9.7 |
| Agglomeration pressure [bar] | — | 100 | 100 | 300 |
| Number of passes [n] | — | 1 | 5 | 5 |
| After-crosslinking with DCP [phr] | 1.5 | 1.4 | 1.4 | 1.4 |
| $d_{10}$ [nm] | 48 | 57 | 59 | 314 |
| $d_{50}$ [nm] | 54 | 68 | 68 | 951 |
| $d_{80}$ [nm] | 58 | 82 | 95 | 1496 |
| Density of the latex particles [g/cm$^3$] | 0.981 | 0.987 | 0.980 | 0.981 |
| Gel content [wt. %] | 99 | 96 | 98 | 98 |
| Swelling index | 5.5 | 5.3 | 5.3 | 4.5 |
| Glass temperature [° C.] | −23.5 | −26.5 | −25.5 | −25 |

Gels for Use in Mixture Series 3) and 4)

TABLE 4

| Gel no. | Gel (9) | Gel (10) | Gel (11) | Gel (12) | Gel (13) | Gel (14) | Gel (15) |
|---|---|---|---|---|---|---|---|
| Styrene content [wt. %] | 22.5 | 22.5 | 22.5 | 22.5 | 22.5 | 22.5 | 22.5 |
| Pre-crosslinking with DCP [phr] | 0.1 | 0.1 | 0.1 | 0.1 | 0.1 | 0.1 | 0.1 |
| Silica sol AC 4055 | 95/5 | 90/10 | 80/20 | 70/30 | | | |
| Levasil 200 | | | | | 90/10 | 80/20 | 70/30 |
| Solids concentration [wt. %] | 27.5 | 27.5 | 25.4 | 23.5 | 30.3 | 30.8 | 31.6 |
| Agglomeration pressure [bar] | 300 | 300 | 300 | 300 | 300 | 300 | 300 |
| Number of passes [n] | 5 | 5 | 5 | 5 | 5 | 5 | 5 |
| After-crosslinking with DCP [phr] | 1.4 | 1.4 | 1.4 | 1.4 | 1.4 | 1.4 | 1.4 |
| $d_{10}$ [nm] | | 90 | | | | | |
| $d_{50}$ [nm] | | 791 | | | | | |
| $d_{80}$ [nm] | | 1606 | | | | | |
| Ash content of the silica-containing gel [wt. %] | 5.0 | 9.6 | 19.5 | 28.6 | 10.1 | 19.6 | 28.9 |
| Ash content of the 50% NR masterbatch [wt. %] | 2.6 | 5.4 | 10 | 15.2 | 5.2 | 10.1 | 14.9 |

Example 2

Compound Preparation, Vulcanization and Properties of the Vulcanizates

In the 1st mixture series (using the gels from Table 2), the properties of gel-containing vulcanizates are compared (See Table 5). Non-agglomerated and agglomerated SBR gels are used for the comparison. The gels have been crosslinked with 1.0 and with 1.5 phr DCP and have no structure.

In the 2nd mixture series (using the gels from Table 3), the influence of the agglomerated gels with structure obtained under various agglomerating conditions on the vulcanizate properties is demonstrated (See Table 6).

In the 3rd mixture series (using the gels from Table 4), the influence of SBR rubber gels co-agglomerated with silicas on the vulcanizate properties is demonstrated, no silica activator being used in the preparation of the compound (See Table 7).

In the 4th mixture series (using the gels from Table 4), the influence of SBR rubber gels co-agglomerated with silicas on the vulcanizate properties is demonstrated, Si69 being added as silica activator in the preparation of the compound (See Tables 8–12).

For the preparation of the mixtures of mixture series 1) to 3), the components listed in the following tables are mixed in the indicated sequence in a laboratory kneader, the gel being incorporated in the form of a 50% NR masterbatch together with a portion of the natural rubber.

After mixing, the compound viscosities at 100° C. (ML 1+4/100° C.), and in the 3rd mixture series additionally the Mooney relaxation, are determined:

The vulcanization speeds of the mixtures are investigated in a rheometer experiment at 160° C. In that manner, characteristic heating times, such as, for example, $t_{95}$, are determined. For the production of the vulcanizates, $t_{95+5}$ is chosen as the vulcanization time. The vulcanization is carried out at 160° C.

The test results collected below are obtained on the basis of the mixtures indicated below.

$1^{st}$ Mixture Series

TABLE 5

| Mixture no.: | 1 | 2 | 3 | 4 |
|---|---|---|---|---|
| TSR 5, Defo 700 | 25 | 25 | 25 | 25 |
| Gel (1)/NR masterbatch (50/50) | 150 | | | |
| Gel (2)/NR masterbatch (50/50) | | 150 | | |
| Gel (3)/NR masterbatch (50/50) | | | 150 | |
| Gel (4)/NR masterbatch (50/50) | | | | 150 |
| Renopal 450 | 3 | 3 | 3 | 3 |
| Antilux 654 | 1.5 | 1.5 | 1.5 | 1.5 |
| Stearic acid | 3 | 3 | 3 | 3 |
| Zinc oxide | 3 | 3 | 3 | 3 |
| Vulkanox 4010 NA | 1 | 1 | 1 | 1 |
| Vulkanox HS | 1 | 1 | 1 | 1 |
| Sulfur | 1.6 | 1.6 | 1.6 | 1.6 |
| Vulkacit NZ | 1 | 1 | 1 | 1 |
| Mixture no.: | 1 | 2 | 3 | 4 |
| ML 1 + 4/100° C. [ME] | 46 | 39 | 45 | 41 |
| Mixture no.: | 1 | 2 | 3 | 4 |
| Vulcanization time [min] | 16.4 | 20 | 15.6 | 17.7 |
| Mixture no.: | 1 | 2 | 3 | 4 |
| Tensile strength ($\delta_{max}$) DIN 53504 [MPa] | 20.5 | 17.1 | 21.4 | 20.1 |
| Elongation at break ($\epsilon_b$) DIN 53504 [%] | 521 | 550 | 520 | 529 |
| Tensile stress at 100% elongation ($\delta_{100}$) DIN 53504 [MPa] | 1.3 | 1.1 | 1.5 | 1.8 |
| Tensile stress at 300% elongation [MPa] ($\delta_{300}$) DIN 53504 | 5.3 | 6.9 | 6.9 | 9.2 |
| Mixture no.: | 1 | 2 | 3 | 4 |
| Shore A hardness, 23° C. DIN 53505 | 49 | 47 | 52 | 55 |
| Shore A hardness, 70° C. DIN 53505 | 46 | 46 | 48 | 51 |
| Rebound resilience, 23° C. ($R_{23}$) DIN 53512 [%] | 55 | 60 | 50 | 54 |
| Rebound resilience, 70° C. ($R_{70}$) DIN 53512 [%] | 69 | 73 | 66 | 70 |
| Abrasion/40 DIN 53516 [mm3] | 861 | 437 | 392 | 333 |
| $R_{70}$-$R_{23}$ [%] | 14 | 13 | 16 | 16 |
| $\delta_{300} \times \epsilon_b$ [MPa × %] | 2.761 | 3.795 | 3.588 | 4.867 |

2nd Mixture Series

TABLE 6

| Mixture no.: | 5 | 6 | 7 | 8 |
|---|---|---|---|---|
| TSR 5, Defo 700 | 25 | 25 | 25 | 25 |
| Gel (5)/NR masterbatch (50/50) | 150 | | | |
| Gel (6)/NR masterbatch (50/50) | | 150 | | |
| Gel (7)/NR masterbatch (50/50) | | | 150 | |
| Gel (8)/NR masterbatch (50/50) | | | | 150 |
| Antilux 654 | 1.5 | 1.5 | 1.5 | 1.5 |
| Stearic acid | 3 | 3 | 3 | 3 |
| Zinc oxide | 3 | 3 | 3 | 3 |
| Vulkanox 4010 NA | 1 | 1 | 1 | 1 |
| Vulkanox HS | 1 | 1 | 1 | 1 |
| Sulfur | 1 | 1 | 1 | 1 |
| Vulkacit NZ | 2 | 2 | 2 | 2 |
| Vulkacit D | 0.5 | 0.5 | 0.5 | 0.5 |
| Mixture no.: | 5 | 6 | 7 | 8 |
| ML 1 + 4/100° C. [ME] | 40 | 39 | 33 | 45 |
| Mixture no.: | 5 | 6 | 7 | 84 |
| Vulcanization time [min] | 20 | 20 | 20 | 20 |
| Mixture no.: | 5 | 6 | 7 | 8 |
| Tensile strength ($\delta_{max}$) DIN 53504 [MPa] | 22.8 | 22.4 | 22.3 | 19.1 |
| Elongation at break ($\epsilon_b$) DIN 53504 [%] | 560 | 540 | 535 | 585 |
| Tensile stress at 100% elongation ($\delta_{100}$) DIN 53504 [MPa] | 1.6 | 1.6 | 1.6 | 2.2 |
| Tensile stress at 300% elongation [MPa] ($\delta_{300}$) DIN 53504 | 7.0 | 7.7 | 8.0 | 10.3 |
| Shore A hardness, 23° C. DIN 53505 | 55 | 56 | 54 | 59 |
| Shore A hardness, 70° C. DIN 53505 | 50 | 50 | 50 | 55 |
| Rebound resilience, 23° C. ($R_{23}$) DIN 53512 [%] | 36 | 37 | 37 | 39 |
| Rebound resilience, 70° C. ($R_{70}$) DIN 53512 [%] | 63 | 63 | 67 | 68 |
| Abrasion/40 DIN 53516 [mm³] | 253 | 223 | 198 | 226 |
| $R_{70}$-$R_{23}$ [%] | 27 | 26 | 30 | 29 |
| $\delta_{300} \times \epsilon_b$ [MPa × %] | 3.920 | 4.158 | 4.280 | 6.026 |

3rd Mixture Series

TABLE 7

| Mixture no.: | 9 | 10 | 11 | 12 | 13 | 14 | 15 |
|---|---|---|---|---|---|---|---|
| TSR 5, Defo 700 | 25 | 25 | 25 | 25 | 25 | 25 | 25 |
| Gel (9)/NR masterbatch (50/50) | 150 | | | | | | |
| Gel (10)/NR masterbatch (50/50) | | 150 | | | | | |
| Gel (11)/NR masterbatch (50/50) | | | 150 | | | | |
| Gel (12)/NR masterbatch (50/50) | | | | 150 | | | |
| Gel (13)/NR masterbatch (50/50) | | | | | 150 | | |
| Gel (14)/NR masterbatch (50/50) | | | | | | 150 | |
| Gel (15)/NR masterbatch (50/50) | | | | | | | 150 |
| Antilux 654 | 1.5 | 1.5 | 1.5 | 1.5 | 1.5 | 1.5 | 1.5 |
| Stearic acid | 3 | 3 | 3 | 3 | 3 | 3 | 3 |
| Zinc oxide | 3 | 3 | 3 | 3 | 3 | 3 | 3 |
| Vulkanox 4010 NA | 1 | 1 | 1 | 1 | 1 | 1 | 1 |
| Vulkanox HS | 1 | 1 | 1 | 1 | 1 | 1 | 1 |
| Sulfur | 1.6 | 1.6 | 1.6 | 1.6 | 1.6 | 1.6 | 1.6 |
| Vulkacit NZ | 1 | 1 | 1 | 1 | 1 | 1 | 1 |
| Vulkacit D | 0.5 | 0.5 | 0.5 | 0.5 | 0.5 | 0.5 | 0.5 |
| Mixture no.: | 9 | 10 | 11 | 12 | 13 | 14 | 15 |
| ML 1 + 4/100° C. [ME] | 54 | 41.2 | 56.2 | 56.1 | 45.5 | 51.7 | 51.0 |
| MR 30 [%] | 2.2 | 3.6 | 5.0 | 5.9 | 2.6 | 3.9 | 3.8 |
| Mixture no.: | 9 | 10 | 11 | 12 | 13 | 14 | 15 |
| Vulcanization time t 95 + 5 [min] | 18 | 15.7 | 16.7 | 15.9 | 16.8 | 14.3 | 14.9 |
| Tensile strength ($\delta_{max}$) DIN 53504 [MPa] | 21.6 | 19.6 | 22.1 | 25.1 | 19.6 | 21.3 | 22.8 |
| Elongation at break ($\epsilon_b$) DIN 53504 [%] | 500 | 620 | 570 | 645 | 535 | 525 | 555 |
| Tensile stress at 100% elongation ($\delta_{100}$) DIN 53504 [MPa] | 2.1 | 1.6 | 1.9 | 1.6 | 1.4 | 1.8 | 1.9 |
| Tensile stress at 300% elongation [MPa] ($\delta_{300}$) DIN 53504 | 11.2 | 7.6 | 8.7 | 7.2 | 8.5 | 9.3 | 9.2 |
| Shore A hardness, 23° C. DIN 53505 | 59 | 58 | 63 | 64 | 54 | 57 | 62 |
| Shore A hardness, 70° C. DIN 53505 | 54 | 54 | 55 | 54 | 52 | 54 | 55 |
| Rebound resilience, 23° C. ($R_{23}$) DIN 53512 [%] | 46 | 45 | 38 | 34 | 48 | 47 | 43 |
| Rebound resilience, 70° C. ($R_{70}$) DIN 53512 [%] | 64 | 68 | 57 | 51 | 70 | 68 | 62 |

TABLE 7-continued

| Mixture no.: | 9 | 10 | 11 | 12 | 13 | 14 | 15 |
|---|---|---|---|---|---|---|---|
| Abrasion/40 DIN 53516 [mm3] | 201 | 258 | 205 | 230 | 254 | 248 | 214 |
| Abrasion/60 DIN 53516 [mm3] | 131 | 202 | 172 | 203 | 239 | 236 | 194 |
| $R_{70}$-$R_{23}$ [%] | 18 | 23 | 19 | 17 | 22 | 21 | 19 |
| $\delta_{300} \times \epsilon_b$ [MPa × %] | 5.600 | 4.712 | 4.959 | 4.644 | 4.548 | 4.883 | 5.106 |

4th Mixture Series

The components of the mixture are mixed according to the following recipes, in the indicated sequence, in a laboratory kneader, for 4 minutes at 140° C.

TABLE 8

| Mixture no.: | 16 | 17 | 18 | 19 | 20 |
|---|---|---|---|---|---|
| TSR 5, Defo 700 | 25 | 25 | 25 | 25 | 25 |
| Gel (11)/NR masterbatch (50/50) | 150 | | | | |
| Gel (12)/NR masterbatch (50/50) | | 150 | | | |
| Gel (13)/NR masterbatch (50/50) | | | 150 | | |
| Gel (14)/NR masterbatch (50/50) | | | | 150 | |
| Ge; (15)/NR masterbatch (50/50) | | | | | 150 |
| Antilux 654 | 1.5 | 1.5 | 1.5 | 1.5 | 1.5 |
| Stearic acid | 3 | 3 | 3 | 3 | 3 |
| Zinc oxide | 3 | 3 | 3 | 3 | 3 |
| Vulkanox 4010 NA | 1 | 1 | 1 | 1 | 1 |
| Vulkanox HS | 1 | 1 | 1 | 1 | 1 |
| Si 69 | 6 | 6 | 6 | 6 | 6 |

When the mixture has been discharged from the kneader, sulfur and accelerator are mixed in on a roller which has been pre-heated to 40° C., the temperature of the mixed material at the end of the mixing time being approximately 70° C.

TABLE 9

| Mixture no.: | 16 | 17 | 18 | 19 | 20 |
|---|---|---|---|---|---|
| Sulfur | 1 | 1 | 1 | 1 | 1 |
| Vulkacit NZ | 2 | 2 | 2 | 2 | 2 |
| Vulkacit D | 0.5 | 0.5 | 0.5 | 0.5 | 0.5 |

After mixing, the compound viscosities at 100° C. ML 1+4 and the Mooney relaxation are determined:

TABLE 10

| Mixture no.: | 16 | 17 | 18 | 19 | 20 |
|---|---|---|---|---|---|
| ML 1 + 4/100° C. [ME] | 39.2 | 43.2 | 39.5 | 40.5 | 41.1 |
| MR 30 [%] | 4.3 | 4.4 | 3.8 | 3.8 | 5.1 |

The vulcanization speeds of the mixtures are investigated in a rheometer experiment at 160° C. In this manner, characteristic heating times, such as, for example, $t_{95}$, are determined. For the production of the vulcanizates, $t_{95+5}$ is chosen as the vulcanization time:

TABLE 11

| Mixture no.: | 16 | 17 | 18 | 19 | 20 |
|---|---|---|---|---|---|
| Vulcanization time t 95 + 5 [min] | 20.5 | 22.3 | 18.5 | 17.7 | 18.5 |

On the basis of the above-mentioned compounds, the following test results are obtained:

TABLE 12

| Mixture no.: | 16 | 17 | 18 | 19 | 20 |
|---|---|---|---|---|---|
| Tensile strength ($\delta_{max}$) DIN 53504 [MPa] | 21.2 | 23.2 | 16.6 | 19.6 | 20.8 |
| Elongation at break ($\epsilon_b$) DIN 53504 [%] | 420 | 438 | 395 | 455 | 428 |
| Tensile stress at 100% elongation ($\delta_{100}$) DIN 53504 [MPa] | 3.2 | 3.3 | 2.2 | 2.7 | 3.1 |
| Tensile stress at 300% elongation [MPa] ($\delta_{300}$) DIN 53504 | 14.5 | 14.5 | 12.2 | 12.7 | 14.1 |
| Shore A hardness, 23° C. DIN 53505 | 71 | 72 | 59 | 64 | 70 |
| Shore A hardness, 70° C. DIN 53505 | 65 | 66 | 58 | 60 | 64 |
| Rebound resilience, 23° C. ($R_{23}$) DIN 53512 [%] | 42 | 38 | 51 | 49 | 46 |
| Rebound resilience, 70° C. ($R_{70}$) DIN 53512 [%] | 61 | 58 | 73 | 70 | 64 |
| Abrasion/40 DIN 53516 [mm3] | 244 | 207 | 322 | 253 | 201 |
| Abrasion/60 DIN 53516 [mm3] | 133 | 119 | 186 | 146 | 131 |
| $R_{70}$-$R_{23}$ [%] | 19 | 20 | 22 | 21 | 18 |
| $\delta_{300} \times \epsilon_b$ [MPa × %] | 6.090 | 6.351 | 4.819 | 5.779 | 6.035 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber mixtures comprising:
   (A) from 1 to 150 parts by weight of at least one agglomerated rubber gel which optionally comprises inorganic fillers;
   (B) at least 100 parts by weight of at least one double-bond-containing rubber; and
   (C) from 0.2 to 20 parts by weight of at least one sulfur-containing organosilicon compound, said rubber mixture further comprising rubber auxiliary substances and, optionally, further fillers.

2. Rubber mixtures according to claim 1, wherein said at least one agglomerated rubber gel is selected from the group consisting of BR, NR, NBR, CR and SBR microgels.

3. Rubber mixtures according to claim 1, wherein said at least one agglome-rated rubber gel comprise particle diameters ranging from 5 to 5000 nm, which optionally, may contain inorganic fillers.

4. Rubber mixtures according to claim 3, wherein said at least one agglomerated rubber gel comprises a particle size distribution wherein the difference between the $d_{80}$ and $d_{10}$ values is greater than 25 nm.

5. Rubber mixtures according to claim 3, wherein said at least one agglome-rated rubber gel is crosslinked, and is insoluble and is swellable in toluene, wherein the swelling indices of the microgels ($Q_i$) in toluene is in the range of from 1 to 15.

6. Rubber articles comprising rubber mixtures which comprise:
(A) from 1 to 150 parts by weight of at least one agglomerated rubber gel which optionally comprises inorganic fillers;
(B) at least 100 parts by weight of at least one double-bond-containing rubber; and
(C) from 0.2 to 20 parts by weight of at least one sulfur-containing organosilicon compound, said rubber mixture further comprising rubber auxiliary substances and, optionally, further fillers.

7. A rubber article according to claim 6, wherein said rubber article is subjected to a dynamic load, such as tire components, damping elements, belts and conveyor belts.

* * * * *